(12) United States Patent
Takano et al.

(10) Patent No.: US 12,204,152 B2
(45) Date of Patent: Jan. 21, 2025

(54) FIBER OPTICAL CONNECTOR WITH REDUCED SIZE

(71) Applicant: Senko Advanced Components, Inc., Hudson, MA (US)

(72) Inventors: Kazuyoshi Takano, Tokyo (JP); Kenji Iizumi, Tokyo (JP); Man Ming Ho, Kowloon (HK); Takuya Ninomiya, Basingstoke (GB)

(73) Assignee: Senko Advanced Components, Inc., Hudson, MA (US)

( * ) Notice: Subject to any disclaimer, the term of this patent is extended or adjusted under 35 U.S.C. 154(b) by 0 days.

(21) Appl. No.: 18/455,214

(22) Filed: Aug. 24, 2023

(65) Prior Publication Data
US 2024/0053549 A1 Feb. 15, 2024

Related U.S. Application Data

(63) Continuation of application No. 17/553,339, filed on Dec. 16, 2021, now Pat. No. 11,762,152.

(60) Provisional application No. 63/165,989, filed on Mar. 25, 2021, provisional application No. 63/127,121, filed on Dec. 17, 2020.

(51) Int. Cl.
*G02B 6/38* (2006.01)

(52) U.S. Cl.
CPC .............. *G02B 6/38875* (2021.05)

(58) Field of Classification Search
CPC .................................................. G02B 6/38875
See application file for complete search history.

(56) References Cited

U.S. PATENT DOCUMENTS

| | | | |
|---|---|---|---|
| 9,494,744 B2 | 11/2016 | de Jong | |
| 2018/0292618 A1* | 10/2018 | Chang | G02B 6/3874 |
| 2019/0353867 A1 | 11/2019 | Claessens et al. | |
| 2020/0012051 A1 | 1/2020 | Coenegracht et al. | |
| 2020/0166716 A1 | 5/2020 | Chang et al. | |

OTHER PUBLICATIONS

International Search Report and Written Opinion, International Application No. PCT/US21/63871, dated Mar. 8, 2022, 14 pages.

* cited by examiner

*Primary Examiner* — Sung H Pak

(57) ABSTRACT

A new fiber optic connector provides a very small form factor with reduced size. The fiber optic connector may comprise a single-body housing having a front end and rear end in a longitudinal direction, two ferrules accommodated in the housing and protruding from the front end of the housing, a back housing positioned adjacent to the rear end of the housing, two springs positioned between the two ferrules and the back housing to urge the two ferrules to move forward, and a boot assembly connected to the rear end of the housing. The housing comprises a latch arm extending obliquely upwards, and the latch arm is in a depressed state when the fiber optic connector is mating with an adapter.

9 Claims, 10 Drawing Sheets

FIBER OPTICAL CONNECTOR WITH REDUCED SIZE

CROSS-REFERENCE TO RELATED APPLICATIONS

This application is a continuation of U.S. patent application Ser. No. 17/553,339, filed Dec. 16, 2021, entitled "Narrow Width Optical Connector and Optical Receptacle" which claims priority to U.S. Provisional Application Ser. No. 63/165,989, filed Mar. 25, 2021, entitled Narrow Width Mini Connector and Ferrule Therefor", and claims priority to U.S. Provisional Patent Application Ser. No. 63/127,121, filed Dec. 17, 2020, entitled "Offset Ports", all of which are hereby incorporated by reference in its entirety.

BACKGROUND

Optical data transmission is well accepted and used throughout the world. Connection of transmission lines or cables to other transmission lines, cables or devices can require a very high number of connections to be made. It is known to use connectors that contain a high number of fibers for making certain connections. However, it can be detrimental, such as in cases where one or more, but fewer than all of the fibers have a defect that requires replacement of the fiber. In cases where connectors carrying multiple fibers are used, the entire connector has to be replaced, causing a disruption of all of the connections being made. Although connectors carrying a fewer number of fibers (e.g., as few as two or one) are known, they do not readily fit into the space allowed for making the connection.

SUMMARY

In one aspect of the present invention, a fiber optic connector constructed for connection with an QSFP style transceiver having an OSFP front opening for receiving fiber optic connectors generally comprises an outer housing having a front, a back, a top, a bottom and two sides extending between the top and bottom. The sides are separated by a distance greater than the diameter of a 1.25 mm outside diameter LC ferrule and defining the width of the fiber optic connector. Optical fibers held in the outer housing provide optical communication through the front of the outer housing. A boot is connected to the back of the outer housing for connecting a fiber optic cable to the fiber optic connector. The width of the outer housing is such that eight fiber optic connectors having the same construction can be removably received in the single front opening of the QSFP style transceiver.

In another aspect of the present invention, a fiber optic connector constructed for connection with a transceiver having a front opening for receiving fiber optic connectors generally comprises an outer housing having a front, a back, a top, a bottom and sides extending between the top and bottom. The outer housing defines a passage extending between the front and back and including a projection extending into the passage. A ferrule supported by the outer housing and including a retaining indention, is received in the passage so that the projection is received in the retaining indention to hold the ferrule in the outer housing. The projection comprises a forward surface shaped to facilitate rearward movement of a rear end portion of the ferrule upon installation into the outer housing past the projection, and a rearward surface shaped to engage an impede forward movement of the ferrule out the front of the outer housing thereby holding the ferrule in the outer housing.

Other aspects and features will be apparent hereinafter.

BRIEF DESCRIPTION OF THE FIGURES

Corresponding reference numbers indicate corresponding parts throughout the drawings.

DETAILED DESCRIPTION

Figure 1:
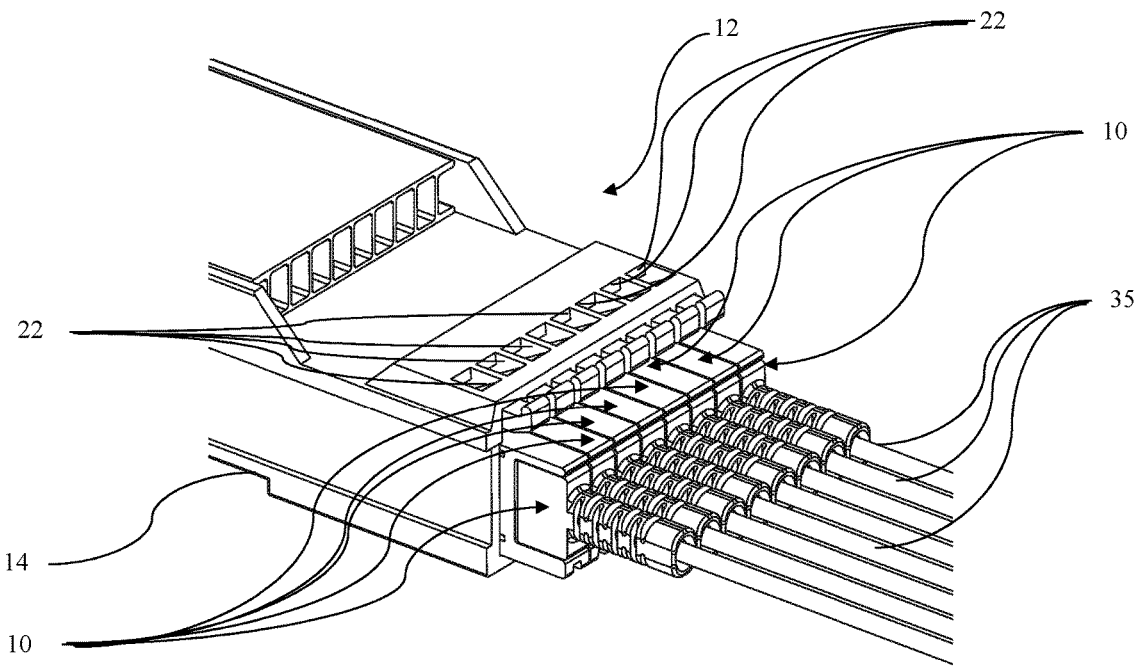
FIG. 1 is a fragmentary perspective of a transceiver receiving eight separate duplex fiber optic connectors.
Figure 2:
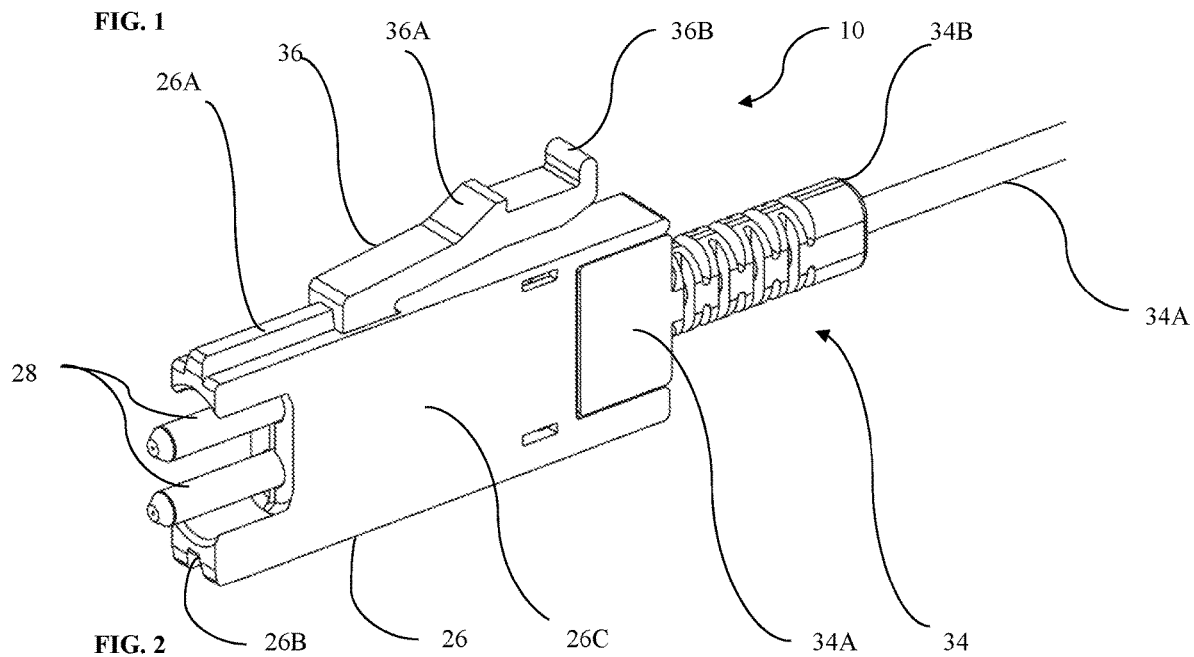
FIG. 2 is perspective of one of the duplex fiber optic connectors.
Figure 3:
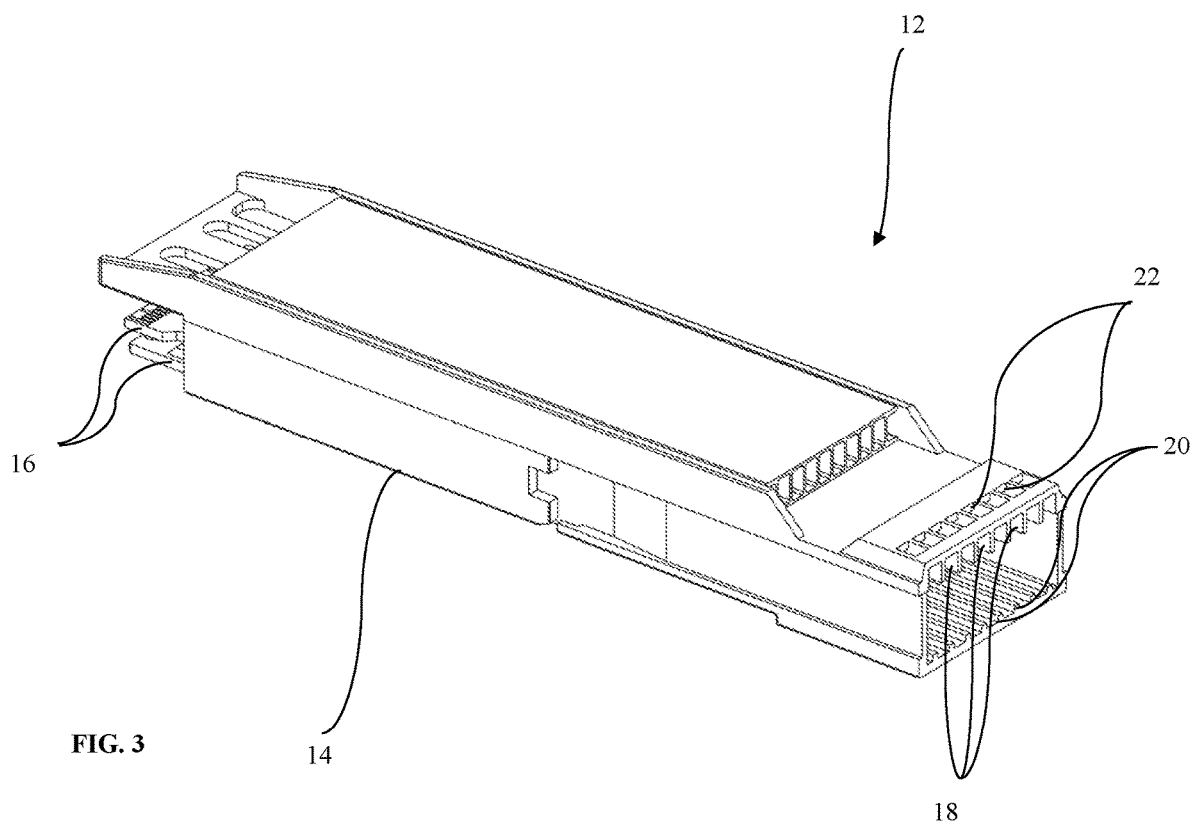
FIG. 3 is a perspective of the transceiver without the duplex fiber optic connectors.

Referring now to the drawings and in particular to FIGS. 1-3, a fiber optic connection system that permits connection of multiple, separate fiber optic connectors 10 to a device, such as a transceiver 12 is shown. In the illustrated embodiment, the transceiver 12 is an octal small form factor pluggable or "OSFP" transceiver, although it will be understood that other devices, including without limitation adapters, other fiber optic connectors, etc. may be used within the scope of the present invention. For purposes of the present disclosure the term "QSFP style transceiver" means to a QSFP transceiver, a QSFP-DD transceiver and/or an OSFP transceiver or any other receiving having a front opening generally within the size range of these transceivers. A QSFP and a QSFP-DD transceiver having front openings having a size of about 13 mm×19 mm. An OSFP transceiver has a front opening having a size of about 14.7 mm×22.93 mm. Conventionally constructed duplex connectors are dimensioned so that no more than four connectors could fit within an opening of an QSFP styles transceiver.

The OSFP transceiver 12 includes a casing 14 that contains one or more printed circuit boards 16 mounting circuitry suitable for converting between optical and electrical signal. At one end of the casing 14 is an opening for receiving separate ones of the fiber optic connectors 10. The casing 14 is particularly formed for receiving eight fiber optic connectors 10. In that regard, an upper wall of the casing 14 defining the opening is formed with depending flanges 18 and a lower wall of the casing is formed with raised ribs 20. Each rib is generally centered between adjacent flanges 18, or between a flange and a side of the opening. The flanges 18 and ribs 20 define eight distinct ports in the opening, one for each of the fiber optic connectors 10. Apertures 22 in the top wall of the casing are configured to receive a portion of a latching mechanism (described hereinafter) of the fiber optic connector 10. It will be understood that the number of ports can be more or fewer than eight (although preferably more than four), and that the structure for releasably latching the fiber optic connectors 10 to the QSFP style transceiver 12.

Figure 4:
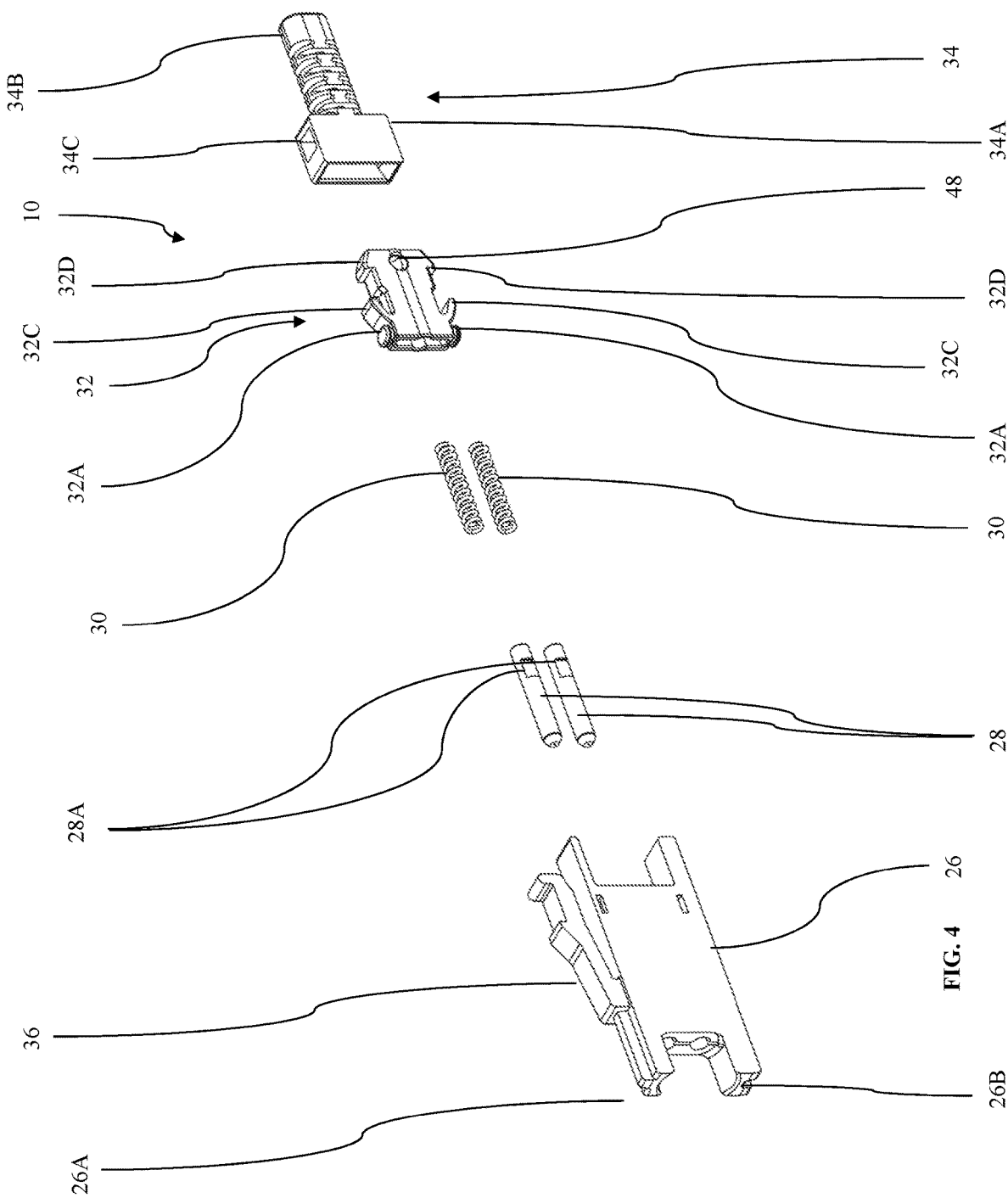
FIG. 4 is an exploded perspective of the duplex fiber optic connector of FIG. 3.
Figure 5:
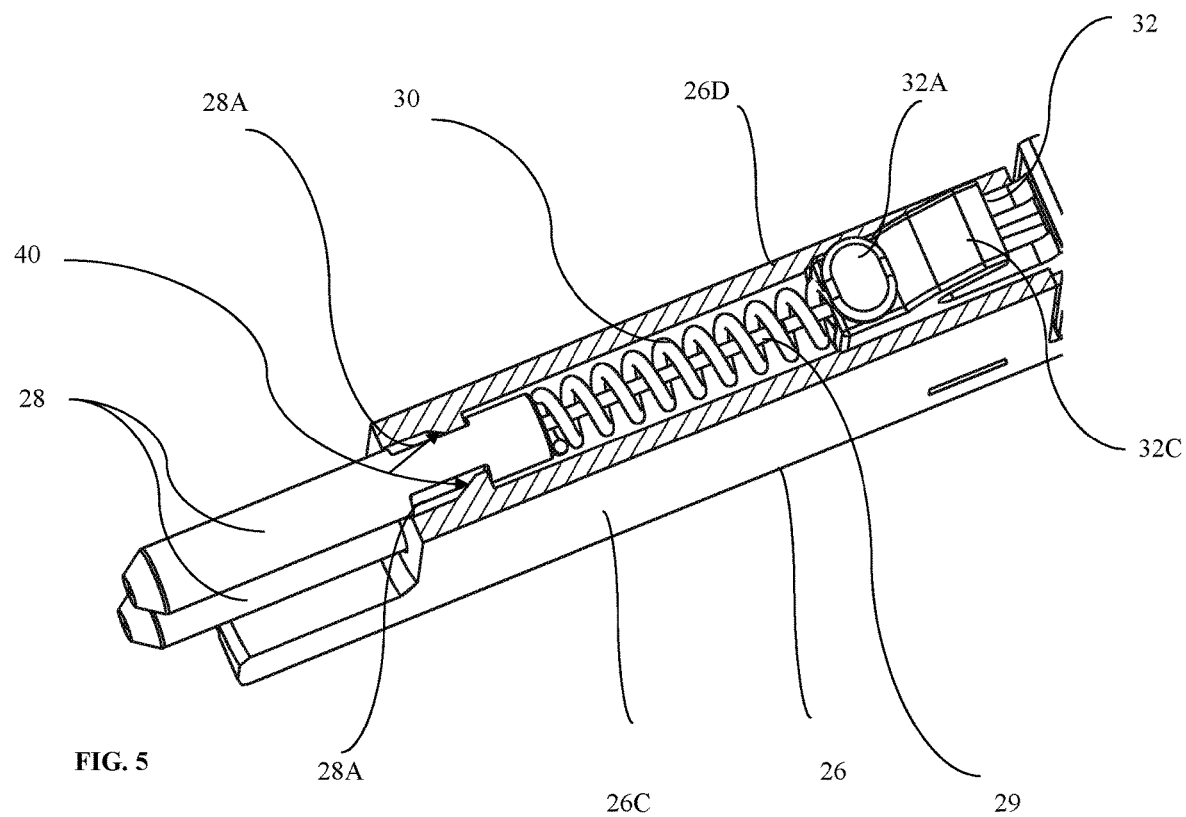
FIG. 5 is a horizontal section in perspective of the duplex fiber optic connector.
Figure 6:
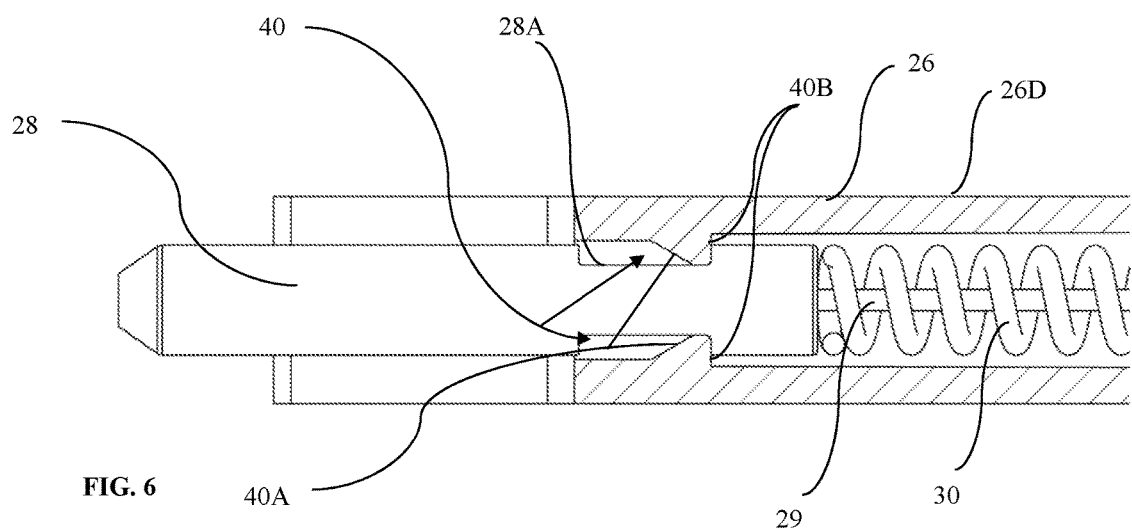
FIG. 6 is an enlarged, fragment of the horizontal section of FIG. 5 shown in elevation.

Referring now particularly to FIGS. 2 and 4, the fiber optic connector 10 includes an outer housing 26 that receives and retains a pair of ferrules 28, each of which holds a single fiber 29 (see, FIGS. 5 and 6). Preferably, the ferrules 28 are readily available LC ferrules having an outside diameter of about 1.25 mm. The ferrules 28 project forward from the outer housing 26, and at least in a fully extended position extend forward of the outer housing. The two ferrules 28 are spaced from each other in a direction extending between a top and bottom of the outer housing 26. Although the ferrules 28 are retained by the outer housing 26, they are movable in a range lengthwise of the ferrules with respect to the outer housing. Springs 30 engage and bias the movement of the ferrules 28 toward a forward most position. Each of the springs 30 engages a respective one of the ferrules 28. A back housing 32 is partially received in and connected to the outer housing 26 at a rear end of the outer housing. Finally, a boot 34 includes a front portion 34A receives a rear portion of the back housing 32 and is positioned between legs of the outer housing 26 to form the completed connector. A flexible portion 34B of the boot 34 extends rearward of the front portion and supports the portion of the cable 35 entering the connector against sharp bends at the intersection with the fiber optic connector 10. Other constructions of the fiber optic connector are possible within the scope of the present invention.

The outer housing 26 has a front, a back, a top, a bottom and two sides extending between the top and bottom. A latch arm 36 is attached to the top of the outer housing 26. More specifically, a forward end of the latch arm 36 is connected to the outer housing 26 and extends to the rear and upward with respect to the outer housing from its point of connection. The latch arm 36 is made of a flexibly resilient material so that the latch arm can be depressed by application of a downward force to the rear of the location where the latch arm is connected to the outer housing 26. The latch arm 36 further includes an intermediate catch 36A between the location where the latch arm is attached to the outer housing 26 and a free end of the latch arm. A free end protrusion 36B extends up from the remainder of the latch arm 36 and facilitated engagement of the latch arm with a finger (or fingernail) to depress and release the latch arm after installation into the OSFP transceiver 12. The intermediate catch has a ramp surface facing toward the front end of the outer housing 26 and a substantially vertical surface at the rear end of the ramp surface that faces rearwardly. As a result, when the fiber optic connector 10 is inserted into a port of the OSFP transceiver 12, an inner edge of the top wall of the casing 14 engages the ramp surface of the latch arm 36, driving the latch arm downward toward the outer housing 26 to permit the fiber optic connector to move further into the port and make fiber optic connection of the ferrules 28 with mating fiber optic connection structure (not shown) in the transceiver. Once the fiber optic connector 10 is substantially fully inserted into the OSFP transceiver 12, the intermediate catch 36A aligns with a corresponding one of the apertures 22. The resilient latch arm 36 is able to spring away from the top of the outer housing 26. The intermediate catch 36A is received in the aperture 22 and the vertical surface of the intermediate catch opposes an interior surface of the aperture so that the fiber optic connector 10 cannot be removed until the latch arm 36 is manually pressed down to move the intermediate latch out of the aperture 22.

In the illustrated embodiment, the transceiver 12 and the outer housing 26 are constructed to require a particular orientation or polarity of the fiber optic connectors 10 when inserted into the opening of the transceiver. The outer housing 26 includes a longitudinally extending ridge 26A (or "first key") on its top and a longitudinally extending slot 26B (or "second key") on its bottom. Adjacent flanges 18 of the casing 14 (or a flange and an adjacent side of the opening in the transceiver 12) define channel sized and shaped to receive the ridge 26A. Similarly, the ribs 20 on the bottom of the opening in the transceiver 12 can be received in the slots 26B of the outer housing 26 to permit connection and guide the fiber optic connector 10 into the transceiver. It will be understood that if the fiber optic connector 10 is inverted with respect to the transceiver 12, the rib 20 of the transceiver would engage the ridge 26A of the outer housing and prevent insertion. If one attempts to misalign the inverted fiber optic connector 10 so that the ridge 26A does not engage the rib 20 of the transceiver 12, then one of the flanges 18 would engage the outer housing 26 adjacent to the slot 26B, preventing insertion of the fiber optic connector into the transceiver in that orientation.

Figure 7:
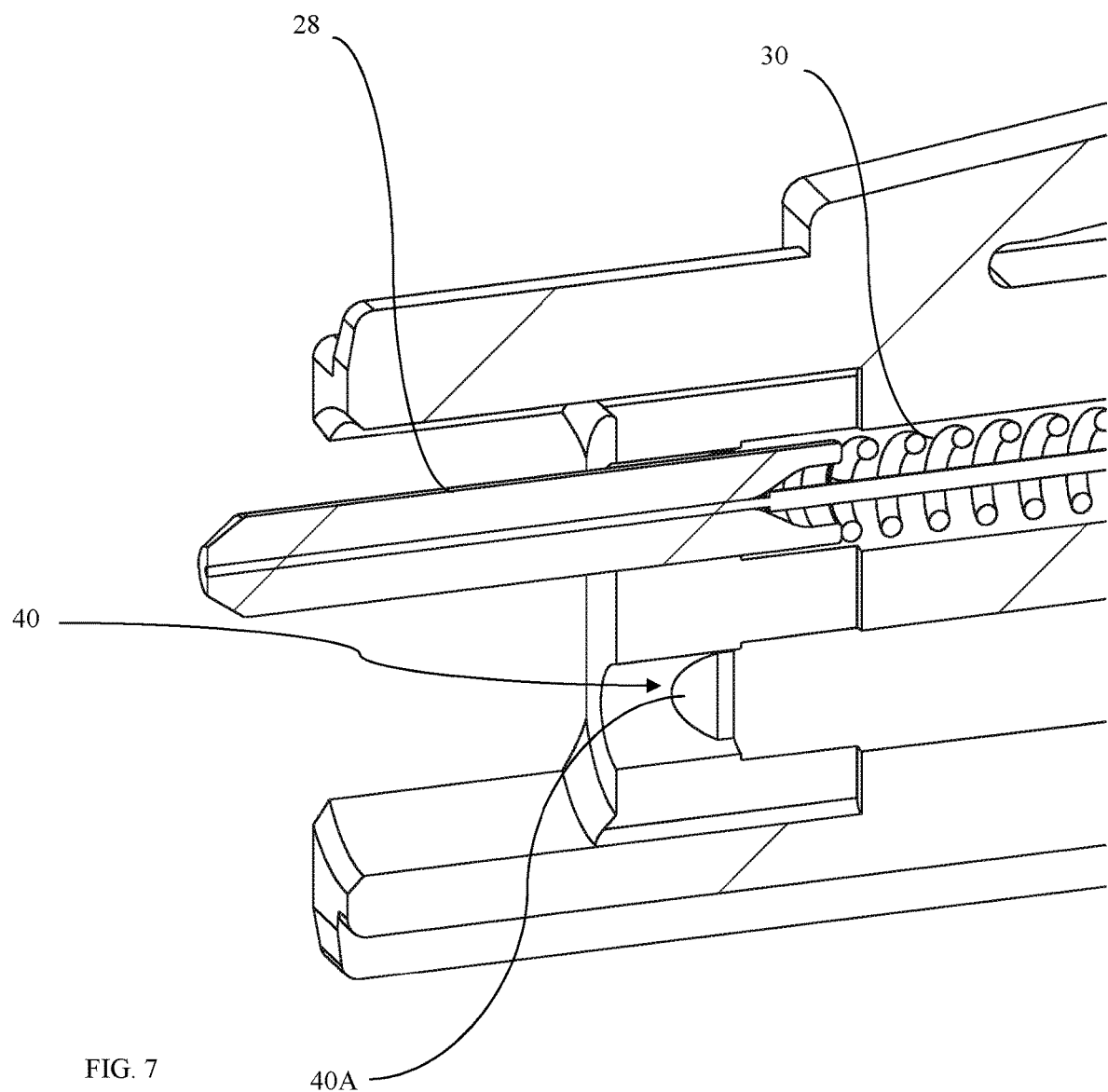
FIG. 7 is an enlarged, fragmentary vertical section of the duplex fiber optic connector of FIG. 2 with one of the ferrules removed to show internal construction of an outer housing of the duplex fiber optic connector.

The ferrules 28 are of a standard (LC ferrule) construction and have an outside diameter of about 1.25 mm. The sides are formed by thin side walls 26C, 26D forming the sides of the outer housing 26. In a preferred embodiment, the side walls 26C, 26D are separated by a distance greater than 1.25 mm to accommodate the LC ferrules. As installed into the transceiver 12, the side walls 26C, 26D of adjacent fiber optic connectors 10 are very close together so that eight fiber optic connectors having standard LC ferrules can fit within the space allotted in an OSFP transceiver opening. Referring now to FIGS. 5-7, the outer housing 26 is formed so that it retains the ferrules 28 in the outer housing without requiring additional structure. More specifically, the interior of the outer housing 26 is formed to define passages the receive respective ones of the ferrules 28. Wedges 40 (broadly, "a projection") are formed in each of the passages in the outer housing 26. In the illustrated embodiment, there are two, opposing wedges 40 in each passage. The wedges 40 include a forward ramp surface 40A and a rearward transverse surface 40B. The ramp surface 40A angles rearward and inward toward a centerline of the passage from its intersection with a wall of the passage. Near the rearward end of the ramp surface 40B, the surface turns to a direction substantially parallel to the centerline of the passage. The overall shape of the wedges 40 is best illustrated in FIG. 7, which shows one of the two wedges 40 in the lower passage (from which the ferrule 28 has been removed). The ferrules 28 are each formed with flats or indentations 28A on opposite sides of the ferrule. The indentations 28a are near, but somewhat forward of the rear ends of the ferrules 28. To install each ferrule 28 in the outer housing 26, a rearward end of the ferrule is inserted into one of the passages defined in the outer housing. The rear end of the ferrule 28 engages the ramp surfaces 40A of the wedges 40. Further insertion of the ferrule 28 causes the rear end to move along the ramp surfaces 40A, thereby driving the side walls 26C, 26D outward so that the transverse dimension of the passage is enlarged at the rear end of the ferrule moves past the wedges 40. Once the indentations 28A become aligned with the wedges 40, the wedges (and side walls 26C, 26D) rebound so that the wedges move into respective ones of the indentations. In this position (illustrated in FIGS. 5 and 6), the transverse surface 40B of the wedge 40 directly opposes a corresponding transverse surface of the ferrule 28 within the indentation 28A. Therefore, the wedges 40 block withdrawal of the ferrule 28 from the passage in the outer housing 26.

The rear ends of the ferrules 28 are engaged by respective ones of the springs 30 when installed in the passages of the outer housing 26. The dimension of the indentions 28A along the longitudinal axis of the ferrules 28 is greater than the corresponding dimension of the wedge 40. Therefore, each ferrule 28 is permitted a range of motion with respect to the outer housing 26 along the longitudinal axis of the ferrule. The end of each spring 30 opposite the end engaging the ferrule 28 engages and is compressed by the back housing 32. Thus, the back housing can be considered a "spring push." The springs 30 bias the ferrules 28 forward, but can be compressed as the fiber optic connector 10 is being inserted into the OSFP transceiver 12 to permit some rearward travel of the ferrules.

Figure 8:
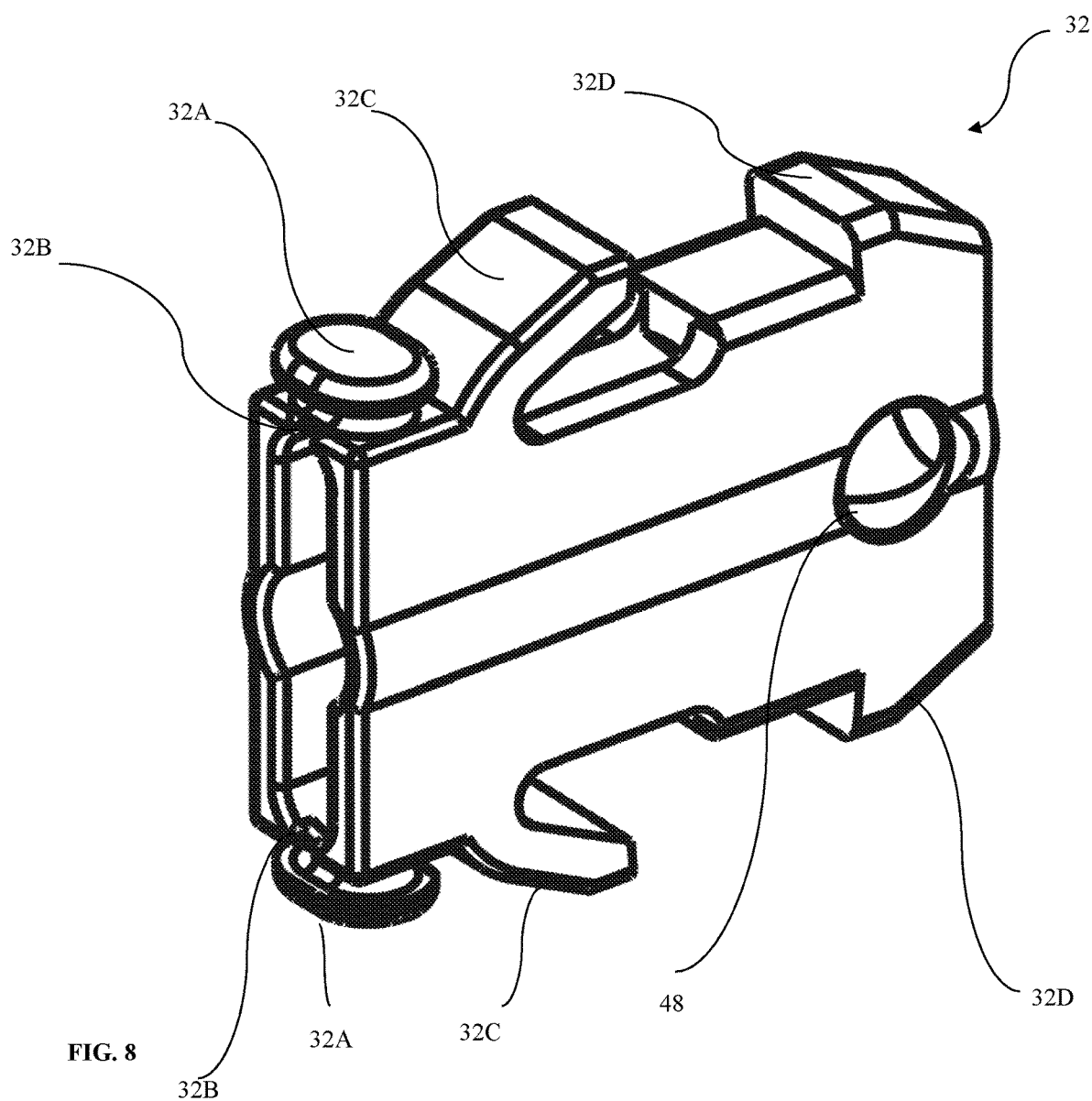
FIG. 8 is the back housing of the duplex fiber optic connector.
Figure 9:
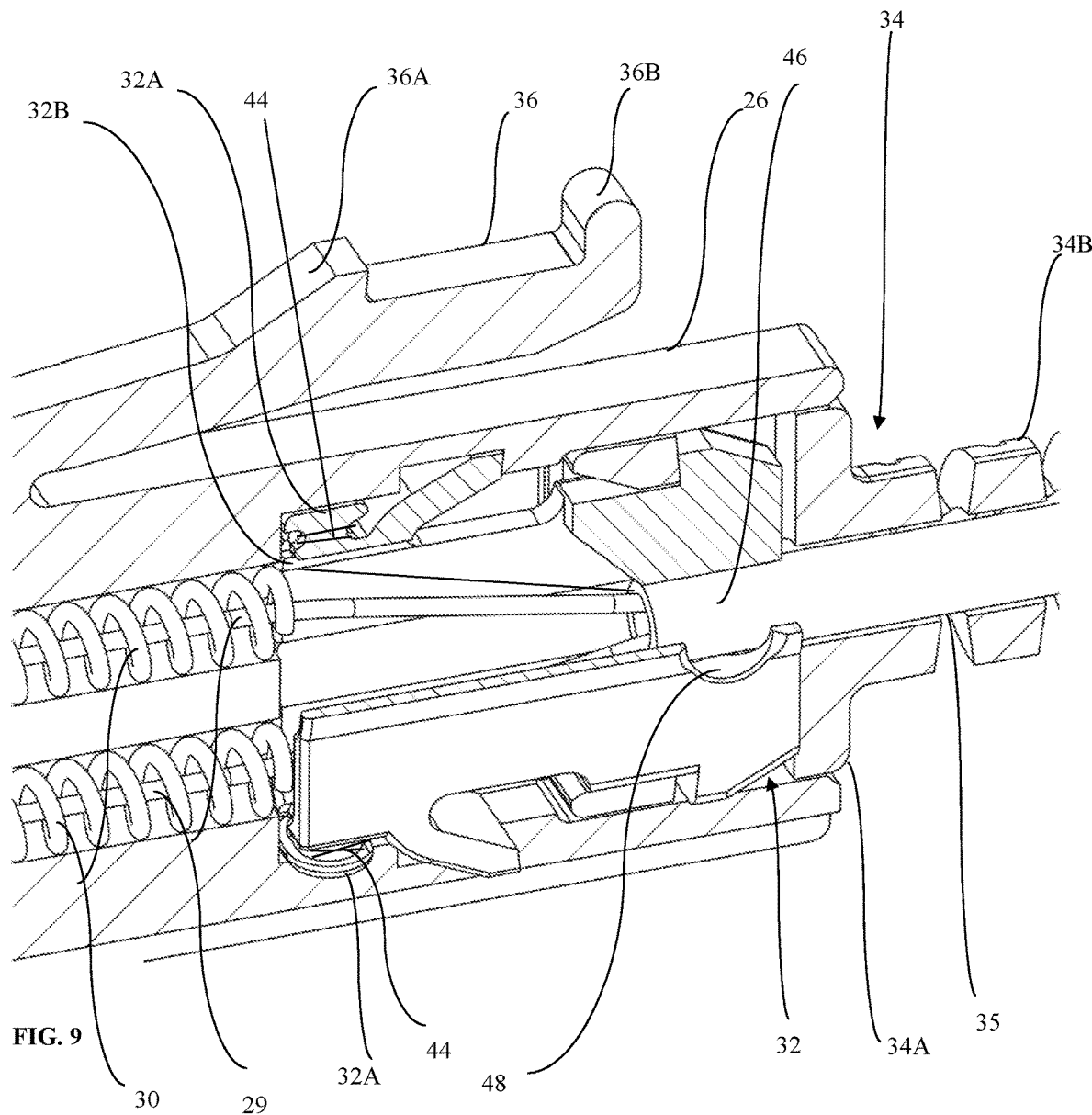
FIG. 9 is an enlarged, fragmentary perspective of the fiber optic duplex connector of FIG. 3.
Figure 10:
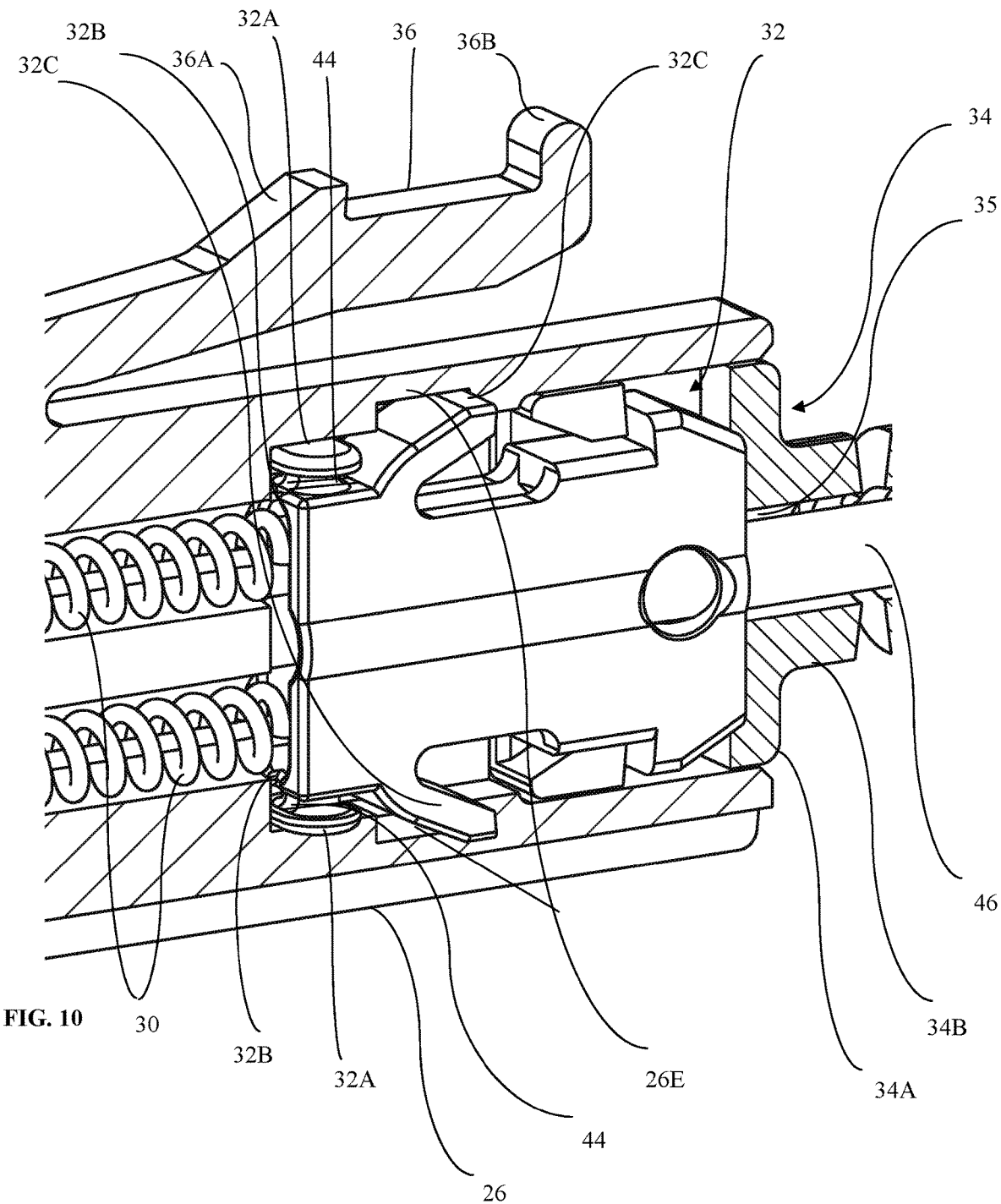
FIG. 10 is a further enlarged fragment of FIG. 9.

The fiber optic connector 10 is particularly constructed to secure strength members 44 of the cable 35 (e.g., Kevlar® strands) directly to the back housing without the use of a crimp ring so that the width dimension of the fiber optic connector can remain small. Referring to FIGS. 8-10, the back housing 32 includes upper and lower posts 32A (broadly, a "holder") projecting transversely outward from the remainder of the back housing. The posts 32A are each shaped to taper to a narrow waist generally in the middle of the post and has an enlarged head at the free end. As may be seen in FIGS. 9 and 10, one or more Kevlar® fibers 44 from the jacket of the cable 35 are extended forward through an open front of the back housing and up (and down) to a corresponding one of the posts 32A. Notches 32B are provided in the forward end of the back housing 32 to pass the Kevlar® fibers 44 from within the back housing to around the posts 32A (see, FIG. 8). The Kevlar® fibers are wrapped around the posts 32A. The tapered waists of the posts 32A help to retain the Kevlar® fibers on the posts. In this way, stress on the cable 35 is transferred directly to the back housing 32 so that the optical fibers 29 of the cable are shielded from this stress and accordingly provided with strain relief. By virtue of the connection of the back housing 32 to the outer housing 26, the stress can be carried by the outer housing and also by the casing 14 of the OSFP transceiver 12, when the fiber optic connector 10 is attached to the transceiver.

The cable 35 is also secured to the back housing 32 by adhering a jacket 46 of the cable to the back housing. Side walls of the back housing 32 are rounded in the middle to conform to the shape of the cable jacket 46 that is received in the back housing. A window 48 in one side of the back housing 32 provides access to deliver an adhesive (e.g., epoxy, not shown) through the window into contact with the jacket 46 of the cable 35 to further secure the cable (excluding fibers 29) to the back housing. This also allows stress applied to the cable 35 outside the fiber optic connector 10 to be transferred directly to the back housing 32 and not to the fibers 29. The window 38 is located on one of the rounded portions of the side walls of the back housing 32.

The back housing 32 can be tightly secured to the outer housing 26 and to the boot by snap in connection. It will be understood that other forms of connection (e.g., adhesive or the use of separate fasteners) may be used within the scope of the present invention. The back housing 32 is shown to comprise upper and lower wings 32C. Each of the wings projects upward and rearward from the connection of the wing 32C to the remainder of the back housing. Upon insertion of the back housing 32 into the outer housing 26, the upper and lower wings 32C deform inward until they come into registration with internal recesses 26E in the outer housing. The upper and lower wings 32C are sufficiently resilient to snap into the internal recesses 26E to prevent withdrawal of the back housing 32 through the rear of the outer housing 26. The back housing 32 is also formed with upper and lower catches 32D at a rear end of the back housing for attachment to the boot 34. The upper and lower catches 32D have rearward facing ramp surfaces that engage a leading edge of a front opening of the boot 34 when the boot is inserted onto the back housing. Top and bottom walls of the boot 34 are deflected outward by engagement with the ramp surfaces of the upper and lower catches 32D so that the catches pass into the boot. The boot 34 is formed with openings 34C on the top and bottom walls that receive the upper and lower catches 32D, respectively, to prevent withdrawal of the boot from the back housing 32.

Figure 11:
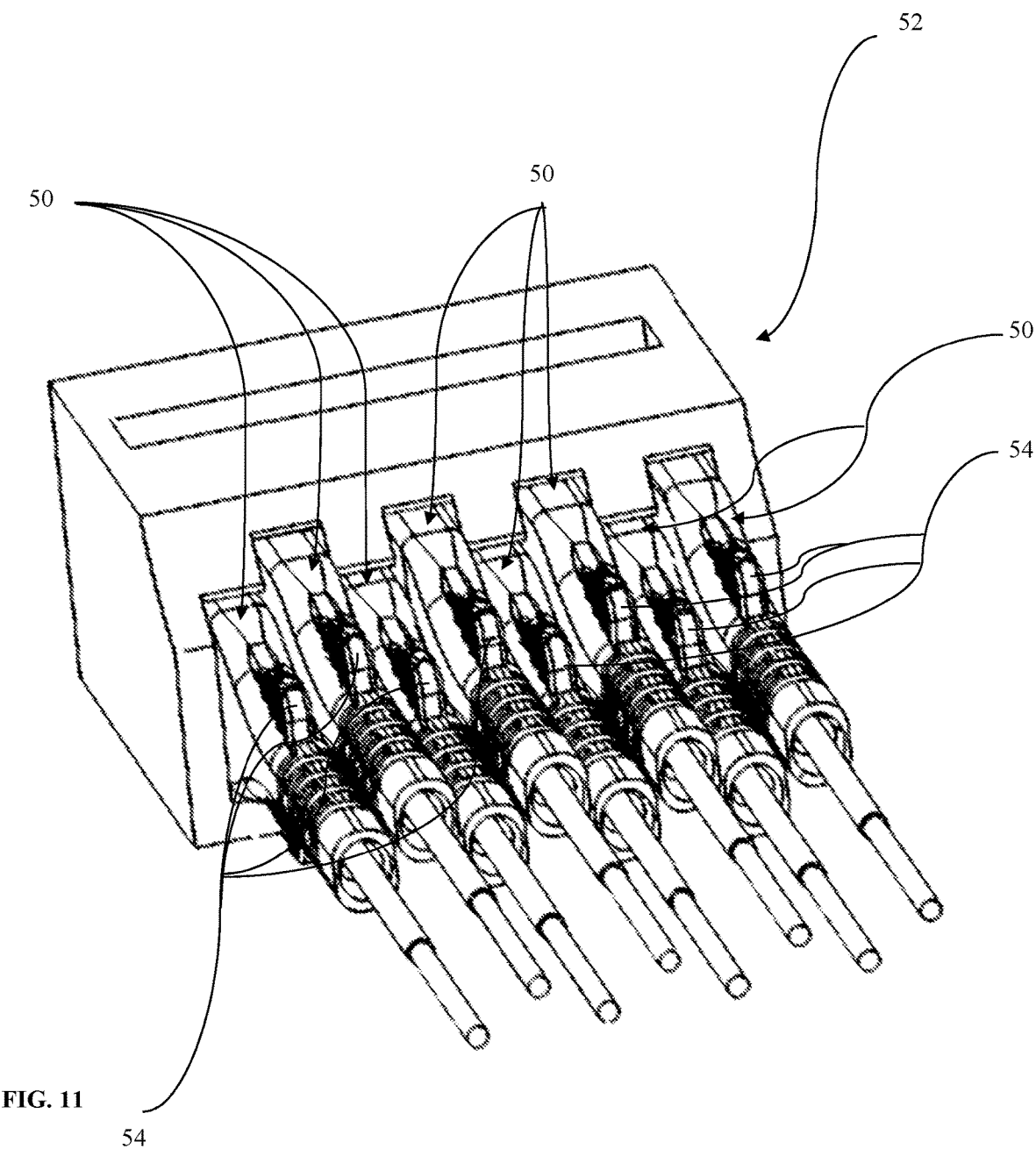
FIG. 11 is a perspective of an adapter and eight connectors attached in an offset manner.
Figure 12:
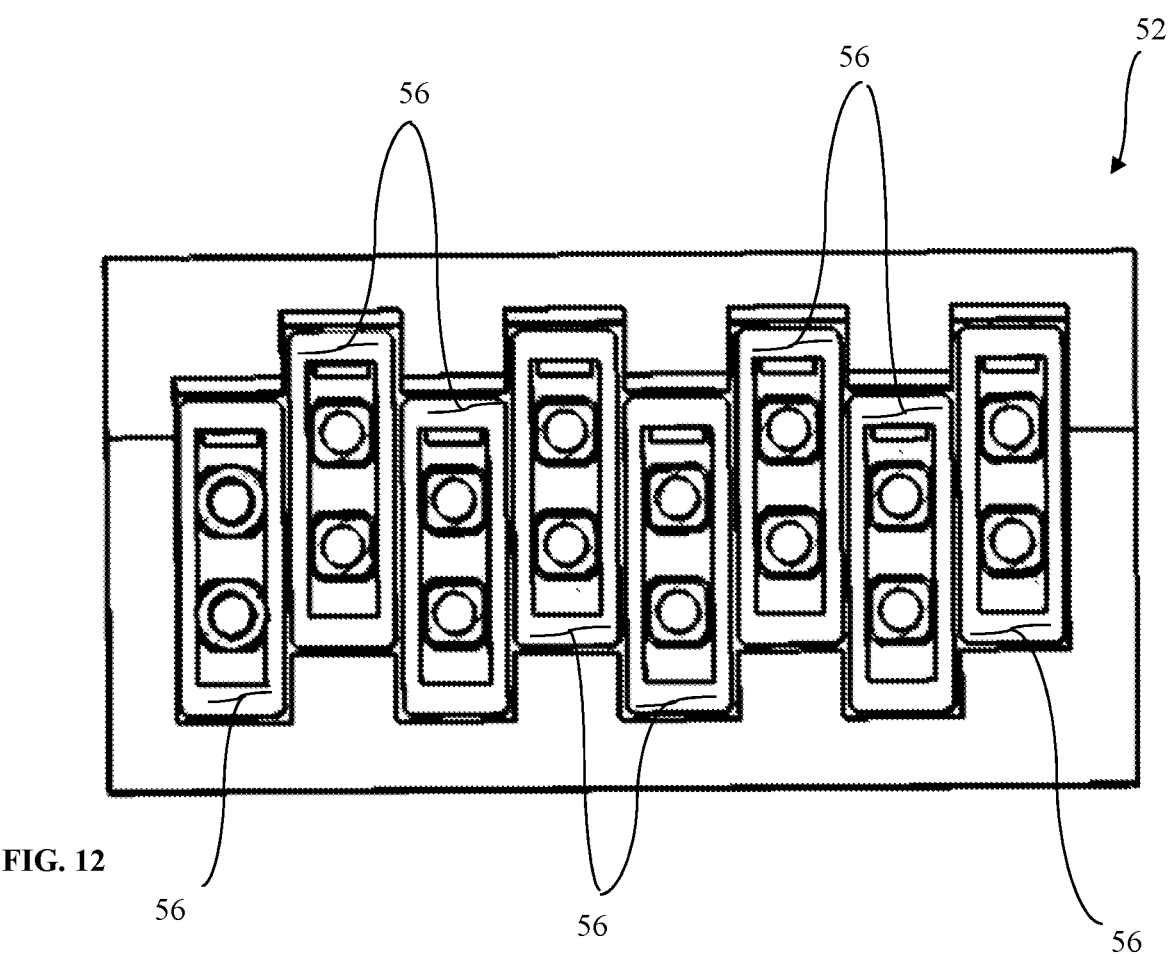
FIG. 12 is a front elevation of the adapter of FIG. 11.

Referring now to FIGS. 11 and 12 a variant of the connection system is shown. Fiber optic connectors 50 are shown as plugged into an adapter 52. Although an adapter 52 is shown, another receptacle, such as a transceiver or other optical device, another connector could be used. The construction of the fiber optic connectors 50 may be generally similar to that described for the embodiment of FIGS. 1-10. However, as shown, the fiber optic connectors 50 also include pull tabs 54.

Referring particularly to FIG. 12, the adapter 52 defines eight ports 56. The ports are offset from one another so that adjacent fiber optic connectors 50 are not aligned with each other as can be seen in FIG. 11. The adapter 52 has a top, a bottom and opposite sides. The ports 56 are offset from each other in a direction extending between the top and bottom of the adapter 52. The offset of fiber optic connectors 50 makes it easier to grasp only one of the connectors when they are plugged into the adapter 52.

This disclosure is not limited to the particular systems, devices and methods described, as these may vary. The terminology used in the description is for the purpose of describing the particular versions or embodiments only, and is not intended to limit the scope.

The present disclosure is not to be limited in terms of the particular embodiments described in this application, which are intended as illustrations of various aspects. Many modifications and variations can be made without departing from its spirit and scope, as will be apparent to those skilled in the art. Functionally equivalent methods and apparatuses within the scope of the disclosure, in addition to those enumerated herein, will be apparent to those skilled in the art from the foregoing descriptions. Such modifications and variations are intended to fall within the scope of the appended claims. The present disclosure is to be limited only by the terms of the appended claims, along with the full scope of equivalents to which such claims are entitled. It is also to be understood that the terminology used herein is for the purpose of describing particular embodiments only, and is not intended to be limiting.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity. Moreover, orientation terms, such as "top," "bottom," "side," etc. are used for convenience of description and do not require a particular orientation of the article described.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations. In addition, even if a specific number of an introduced claim recitation is explicitly recited, those skilled in the art will recognize that such recitation should be interpreted to mean at least the recited number (e.g., the bare recitation of "two recitations," without other modifiers, means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

As will be understood by one skilled in the art, for any and all purposes, such as in terms of providing a written description, all ranges disclosed herein also encompass any and all possible subranges and combinations of subranges thereof. Any listed range can be easily recognized as sufficiently describing and enabling the same range being broken down into at least equal halves, thirds, quarters, fifths, tenths, etc. As a non-limiting example, each range discussed herein can be readily broken down into a lower third, middle third and upper third, etc. As will also be understood by one skilled in the art all language such as "up to," "at least," and the like include the number recited and refer to ranges which can be subsequently broken down into subranges as discussed above. Finally, as will be understood by one skilled in the art, a range includes each individual member. Thus, for example, a group having 1-3 cells refers to groups having 1, 2, or 3 cells. Similarly, a group having 1-5 cells refers to groups having 1, 2, 3, 4, or 5 cells, and so forth.

What is claimed is:

1. A fiber optic connector with reduced size, comprising:
a single-body housing having a front end and rear end in a longitudinal direction, and including a top wall and a bottom wall extending from the front end to the rear end;
two ferrules accommodated in the housing and protruding from the front end of the housing, and the two ferrules spaced from each other in a direction extending between the top wall and the bottom wall;
a back housing positioned adjacent to the rear end of the housing;
two springs positioned between the two ferrules and the back housing to urge the two ferrules to move forward; and
a boot assembly connected to the rear end of the housing, wherein the fiber optic connector comprises a latch arm connecting to the top wall and extending obliquely upwards, and the latch arm is in a depressed state when the fiber optic connector is mating with an adapter, and wherein the back housing includes upper and lower wings projecting from the back housing.

2. The fiber optic connector of claim 1, wherein each of the two ferrules includes an indentation.

3. The fiber optic connector of claim 1, wherein each of the two ferrules has a diameter of about 1.25 mm.

4. The fiber optic connector of claim 1, wherein the housing includes two openings adjacent to the front end, and two openings are configured to hold the two ferrules.

5. The fiber optic connector of claim 1, wherein the back housing is configured to be received in the housing.

6. The fiber optic connector of claim 5, wherein the upper and lower wings are configured to snap into the housing to prevent the withdrawal of the back housing from the housing.

7. The fiber optic connector of claim 1, wherein the back housing includes upper and lower posts.

8. The fiber optic connector of claim 1, wherein the latch arm includes a connection end to the housing and a free end spaced a distance from the housing, and an intermediate catch is provided between the connection end and free end.

9. The fiber optic connector of claim 8, wherein the intermediate catch includes a ramp surface and a substantially vertical surface.

* * * * *